(12) United States Patent
Heer

(10) Patent No.: US 8,628,602 B2
(45) Date of Patent: Jan. 14, 2014

(54) AIR PROCESSING DEVICE WITH TWO AIR DRYER CARTRIDGES

(75) Inventor: Siegfried Heer, Wiesloch (DE)

(73) Assignee: Haldex Brake Products GmbH, Heidelberg (DE)

( * ) Notice: Subject to any disclaimer, the term of this patent is extended or adjusted under 35 U.S.C. 154(b) by 258 days.

(21) Appl. No.: 13/182,984

(22) Filed: Jul. 14, 2011

(65) Prior Publication Data

US 2012/0031273 A1 Feb. 9, 2012

(30) Foreign Application Priority Data

Jul. 14, 2010 (DE) .......................... 10 2010 031 306

(51) Int. Cl.
*B01D 53/26* (2006.01)

(52) U.S. Cl.
USPC .......................... 95/115; 95/121; 55/DIG. 17

(58) Field of Classification Search
USPC .......... 95/1, 117; 96/109, 115, 121, 130, 133; 55/DIG. 17
See application file for complete search history.

(56) References Cited

U.S. PATENT DOCUMENTS

| | | | |
|---|---|---|---|
| 4,197,095 A | 4/1980 | White, Jr. et al. | |
| 4,605,425 A | 8/1986 | Verrando et al. | |
| 4,718,020 A | 1/1988 | Duich et al. | |
| 4,812,148 A | 3/1989 | Hata et al. | |
| 4,941,894 A * | 7/1990 | Black ............................... | 95/14 |
| 5,103,576 A | 4/1992 | Cramer et al. | |
| 5,685,896 A | 11/1997 | Castle et al. | |
| 5,901,459 A | 5/1999 | Trapp et al. | |
| 5,901,464 A | 5/1999 | Kazakis et al. | |
| 5,961,698 A | 10/1999 | Dossaji et al. | |
| 5,983,516 A | 11/1999 | Trapp et al. | |
| 6,014,820 A | 1/2000 | Jones et al. | |
| 7,103,991 B2 | 9/2006 | Moulding | |
| 7,115,152 B2 * | 10/2006 | Friday et al. ......................... | 95/1 |
| 7,331,592 B2 * | 2/2008 | Heer .......................... | 280/124.16 |
| 7,431,406 B2 * | 10/2008 | Aumuller et al. ............... | 303/15 |
| 7,625,437 B2 | 12/2009 | Heer | |
| 7,846,242 B2 | 12/2010 | Paling et al. | |

FOREIGN PATENT DOCUMENTS

| | | |
|---|---|---|
| DE | 32 44 414 A1 | 6/1984 |
| DE | 35 25 083 A1 | 1/1987 |
| DE | 103 38 162 B3 | 6/2005 |
| DE | 10 2004 059 508 C5 | 7/2008 |
| DE | 10 2008 006 860 A1 | 8/2009 |
| DE | 10 2008 038 437 A1 | 2/2010 |
| EP | 0 093 253 B2 | 9/1990 |
| EP | 0 808 756 B2 | 3/1997 |
| EP | 0 933 117 A1 | 8/1999 |
| EP | 1 635 930 B1 | 6/2004 |

(Continued)

OTHER PUBLICATIONS

Data sheet of the prodcut with Prodct No. 432431 of the Company WABCO (2 Pages), Jan. 2010.

(Continued)

*Primary Examiner* — Frank Lawrence, Jr.

(74) *Attorney, Agent, or Firm* — Thomas | Horstemeyer, LLP

(57) ABSTRACT

An air processing device for a utility vehicle includes a compressor and two air dryer cartridges. The air dryer cartridges are located in two parallel paths. A control unit controls a regeneration of one of said air dryer cartridges independent from a load phase of the other of said air dryer cartridges.

19 Claims, 9 Drawing Sheets

(56) References Cited

FOREIGN PATENT DOCUMENTS

| EP | 1 508 488 B2 | 8/2004 |
|---|---|---|
| EP | 1 390 244 B1 | 2/2007 |
| WO | 91/16224 | 10/1991 |

OTHER PUBLICATIONS

European Search report for the European copending application No. 11171179.2, mailed on Dec. 1, 2011.

* cited by examiner

AIR PROCESSING DEVICE WITH TWO AIR DRYER CARTRIDGES

CROSS REFERENCE TO RELATED APPLICATIONS

This application claims priority to co-pending German Patent Application No. DE 10 2010 031 306.8 entitled "Druckluftaufbereitungseinrichtung mit zwei Lufttrocknungskartuschen", filed Jul. 14, 2010.

FIELD OF THE INVENTION

The present invention generally relates to an air processing device with a compressor and two air dryer cartridges. In the air processing device for a load phase or supply phase the compressor is connected via an air dryer cartridge with the pressurized air system including pressurized air circuits. Instead, during a regeneration a pressurized air source of the pressurized air system is connected via an air dryer cartridge with a de-aerating port for a reverse flow of dried air.

BACKGROUND OF THE INVENTION

In air processing devices known from the prior art air dryer cartridges are used for extracting humidity contained in the pressurized air supplied by the compressor. Due to the fact that the desiccant used in the air dryer cartridges only has a limited capacity for the humidity (and other particles, oil droplets or contaminations), after a specific time of use of an air dryer cartridge in the load phase a regeneration of the air dryer cartridge is required. During the regeneration air previously dried streams in reverse direction through the air dryer cartridge for extracting humidity or other contaminations from the desiccant of the air dryer cartridge. Accordingly, the input port of the air dryer cartridge during the load phase is connected with the compressor, whereas the same port during the regeneration is connected with a de-aerating port. However, the intermittent load phases and regeneration phases of an air dryer cartridge have the consequence that a permanent supply of dried pressurized air is not possible. Instead, the supply of dried pressurized air is interrupted for the time of the regeneration.

For avoiding these interruptions, air processing devices are known having two (or more) air dryer cartridges. For these air processing devices it is possible to regenerate one of the two air dryer cartridges while using the other of the air dryer cartridges for a simultaneous load phase. Accordingly, it is possible to permanently supply pressurized air from the compressor. For these air processing devices the stream of dried pressurized air output from the air dryer cartridge used in the load phase is divided in two partial air streams. The first partial air stream is used for supplying the pressurized air system or circuits. The other partial air stream is used for the regeneration of the other air dryer cartridge and streams in reverse direction through the other air dryer cartridge for a regeneration of the same. However, in consequence throughout the whole use of the compressor only a partial air stream of the pressurized air supplied by the compressor is in fact supplied to the consumer circuits. Air processing devices with two air dryer cartridges are also called "twin towers". By use of twin towers, the need might be overcome to activate and deactivate the compressor—instead the compressor might be permanently driven which leads to a simplification of the control of the compressor and/or of an increase of the lifetime of the compressor.

U.S. Pat. No. 5,685,896 suggests using a twin tower with a valve unit comprising two valve groups. Each of these two valve groups is related with one of the air dryer cartridges. The two valve groups in an alternating fashion are controlled into a switching state "load" and a switching state "regeneration". By means of a pneumatic control pressure after a predetermined time both valve groups are switched to the other operating state. The outputs of the air dryer cartridges are connected via a kind of switching valve with the pressurized air system or circuits, wherein the valve element of the switching valve comprises a throttle bore for redirecting a dried partial air stream to the air dryer cartridge used in the regeneration state.

EP 0 933 117 A1 also discloses the use of a switching valve for dividing an air stream supplied by a compressor into two partial air streams. Also here one partial air stream is used for supplying the pressurized air system or circuits with pressurized air whereas the other partial air stream is used for a regeneration of the other air dryer cartridge.

Other air processing devices using switching valves for treating two partial air streams are disclosed in documents U.S. Pat. No. 5,901,459, U.S. Pat. No. 5,901,464 and U.S. Pat. No. 5,983,516.

U.S. Pat. No. 5,961,698 related to the removal of segregated particles or fluid from a twin tower. During the regeneration of an air dryer cartridge a cyclone and additional filter elements are used. The alternating use of the two air dryer cartridges is controlled by a solenoid valve which is switched by a timer.

DE 35 25 083 A1 discloses the supply of a pressurized air system comprising a multi protection valve linked with a central conduit with an integrated check valve to a compressor via a pressure controller and a switching valve. The switching valve is connected with two paths that are connected with the central conduit upstream from the check valve. In both paths respective air dryer cartridges are used. A 4/2-way solenoid valve by alternating switching controls two operating states. In the two operating states in alternating fashion one path is used for the load phase, whereas the other path is used for a regeneration. Check valves opening in load or supply direction are located in the paths, wherein the check valves are located downstream from the air dryer cartridges. Respective bypass conduits are provided for bypassing the check valves. Throttles are integrated into the bypass conduits. De-aerating valves are located upstream from the air dryer cartridges, wherein the de-aerating valves in an alternating fashion are pilot-controlled by the 4/2-way solenoid valve. Due to the pneumatic pilot control by the electronically controlled 4/2-way solenoid valve, the de-aerating valve in the path used for the load or supply phase is blocked so that pressurized air from the compressor is supplied via the pressure controller and the switching valve, the air dryer cartridge of this path and the check valve to the central conduit. Instead, at the same time the 4/2-way solenoid valve opens the de-aerating valve in the other path for a regeneration. A partial air stream of dried air from the path in the load phase streams via the bypass conduit and the throttle in reverse direction through the air dryer cartridge in the path being regenerated. With the dried air flowing in reverse direction humidity and contaminations from the air dryer cartridge to be regenerated are transferred via the de-aerating valve to the environment. An alternative embodiment disclosed in this document addresses the changing process for the use of one path for the load phase to the use of this path in the regeneration state. The document suggests using a two-pressure valve parallel to the switching valve, wherein an output of the two-pressure valve is connected with the 4/2-way solenoid valve. On the other hand, the document suggests to use two 3/2-way solenoid valves instead of the 4/2-way solenoid valve, wherein in this case the two 3/2-way solenoid valves are used for controlling the alternating load phases and regeneration phases in the two paths.

Also DE 32 44 414 A1 discloses the alternating use of two paths with associated air dryer cartridges for a load phase and a regeneration phase. At the input of the two paths a 4/2-way solenoid valve is located. In one switching state of the 4/2-way solenoid valve one path is connected with the compressor for the load phase, whereas the other path is connected with the de-aerating port. The partial air stream used for the regeneration is taken from the central conduit upstream from a check valve. This partial air stream after having passed a throttle valve flows through the air dryer cartridge in the path operated for regeneration streaming in reverse direction. For keeping the relation of the flow of the partial air stream in the path operated in the load state to the partial air stream in the path operated for regeneration independent on the delivery rate of the compressor the patent application suggests using a throttle valve with a continuously variable throttle characteristic. A change of the throttle characteristic is pneumatically controlled. As the control pressure for controlling the throttle characteristic the pressure at the output of the compressor is used.

SUMMARY OF THE INVENTION

An established route of the person with skill in the art bases on the assumption that a regeneration of the desiccant in an air dryer cartridge is to be interrupted during the load phase of the air dryer cartridge which is necessary for air processing devices having only one single air dryer cartridge. Following this route, a lot of measures are to be taken for optimizing the load phases and the regeneration phases. On the other hand, the present invention also does not follow the route that twin towers with two air dryer cartridges are necessarily operated by alternately using the air dryer cartridges with one air dryer cartridge in the load phase and at the same time the other air dryer cartridge in the regeneration phase. Instead, according to the invention in the air processing device with two air dryer cartridges a regeneration phase of one air dryer cartridge is controlled independent on a load phase of the other air dryer cartridge. This might mean that the phases are independently initiated, terminated, interrupted, or also that the flow characteristics in the phase are controlled independent from each other.

Pneumatic connections or valves in the conduits from the compressor via the air dryer cartridge used in the load phase to the pressurized air system and/or from a pressure source of the pressurized air system in a reverse flow via the air dryer cartridge used in the regeneration phase to a de-aeration port might be controlled independent from each other.

Within the frame of the invention the term "control" both covers an open loop control as well as a closed loop control. Furthermore, a "control of a pneumatic connection" both covers a digital change of the pneumatical connection from a closed state to an open state (and vice versa) as well as any other change of the pneumatic characteristic of the pneumatical connection, in particular a change of the flow rate.

By means of an independent control claimed by the present invention a plurality of options for influencing the air streams in the air processing unit are provided. In the following, only some of these options are mentioned:

In a load phase of a first air dryer cartridge located between a compressor and the pressurized air system the second air dryer cartridge might be independently controlled in the regeneration phase. To name only some examples, the regeneration phase of the second air dryer cartridge might only last for a part of the load phase of the first air dryer cartridge, whereas during another part of the load phase of the first air dryer cartridge no stream of dried air is streaming for regeneration through the second air dryer cartridge. This might result in the advantage that during the part of the load phase without a regeneration of the second cartridge the whole air stream supplied by the compressor is supplied via the first air dryer cartridge to the pressurized air system or circuits.

It is also possible that at least a pneumatical connection from or to the air dryer cartridges is controlled in dependence on operating states. To name only one example: In case that a large volumetric flow of pressurized air is indicated by the operating states of the utility vehicle (e.g. increased pneumatic brake actions for longer downhill drives) the regeneration phase of the second cartridge might be interrupted or terminated or initiated with some delay.

Furthermore, it is possible that the regeneration phase is adapted with respect to the regenerating air stream and/or the duration of the regeneration to an approximated or measured regeneration need. Possible is an adaption to the pressure states, to the cumulated load phase times of the air dryer cartridge since the last regeneration, to the overall time of use of an air dryer cartridge, to states of the environment as temperature or the humidity of the air taken from the environment in dependence on the season, temperature or weather. It is also possible that a humidity of a desiccant of at least one air dryer cartridge is directly or indirectly determined or sensed. A regeneration phase might be initiated or terminated when detecting that the determined or sensed humidity exceeds a predetermined limit value. The humidity of the desiccant of the air dryer cartridge might be indirectly sensed, e.g. by measuring the humidity of the pressurized air both downstream and upstream from the air dryer cartridge. A comparison or correlation of the sensed humidities of these air streams might be used for indirectly estimating the humidity of the desiccant in the air dryer cartridge. However, it is also possible that a humidity sensor is integrated into the air dryer cartridge or the desiccant for directly sensing the humidity of the desiccant.

To name an exemplary extreme case, it is also possible that in case that an extraordinary large need for pressurized air is indicated both air dryer cartridges are not regenerated but both air dryer cartridges are temporarily supplied with pressurized air from the compressor in a load phase of both air dryer cartridges. Throughout these phases the compressor might be driven with an increased pump capacity or number of revolutions.

For determining the time for initiating and/or terminating a regeneration phase of an air dryer cartridge and/or for determining the duration of the regeneration phase or for determining the required regeneration air stream, the person with ordinary skill in the art might revert to the prior art, e.g. as described in EP 0 808 756 B2. The measures disclosed in the prior art might be considered for controlling the air dryer cartridge within the inventive method. Another method for determining a suitable duration of the regeneration phase might be taken from EP 1 390 244 B1. Further measures for determining the pressurized air volume streaming through an air dryer cartridge, for determining the starting time for the regeneration time, the required pressurized air volume for the regeneration and a point in time for terminating the regeneration phase are in particular known from documents EP 0 093 253 B2 and WO-A-91/16224. According to DE 10 2004 059 508 C5 it is possible that in the air dryer cartridge not only humidity is extracted from the pressurized air. Instead, also particles, fluids, oil of the compressor, residues from carbonizations, wear particles and the like might be separated from the air stream by the desiccant and/or by additional filter means as a coalescing filter, by a division of partial volumetric flows within the air dryer cartridge or by collecting spaces for separated particles and the like. These contaminants of the pressurized air might be removed from the air dryer cartridge during the regeneration without leaving the frame of the present invention. It is also possible that the air dryer cartridge is built with a plurality of chambers for the desiccant and/or a plurality of different materials. Different filter media as well as a plurality of different regenerating air streams within an air dryer cartridge might also be taken from EP 1 635 930 B1. The options for influencing the pump capacity or number of revolutions of a compressor might be taken from DE 10 2008 006 860 A1. Any of the measures specified above being known from the prior art for air processing devices comprising solely one single air dryer cartridge might be integrated into the inventive air processing device without leaving the frame of the present invention.

The pneumatic connections of the air dryer cartridges with the compressor and/or with the de-aerating port might for one example be controlled in dependence on the needs with the aim to keep the regeneration phases as short as possible. This might result in an optimization conflict to provide a sufficient regeneration and/or position the regeneration phases within operating states wherein the partial pressurized air stream required for the regeneration phase is not of relevance, in particular throughout operating states of the utility vehicle with a decreased need of pressurized air.

In general, the inventive control of the pneumatic connection might be done by use of any valve unit. For one embodiment of the invention, at least one valve is located upstream from the air dryer cartridges. The at least one valve is used for selectively connecting one air dryer cartridge or the other air dryer cartridge with the compressor and/or with the de-aerating port. To name only some examples for such valve, in the present application a 5/2-way valve is located upstream from the two air dryer cartridges. The 5/2-way valve comprises two outputs to the air dryer cartridges, one input connected with the compressor and two de-aerating ports. In a first switching state the 5/2-way valve connects the first air dryer cartridge with the compressor, whereas the second air dryer cartridge is connected with the de-aerating port for a regeneration phase. Instead, in the other switching state the first air dryer cartridge is connected with the de-aerating port, whereas the second air dryer cartridge is connected with the compressor. For an alternative embodiment it is also possible to use two 3/2-way valves. These 3/2-way valves each comprise one port connected with the respective air dryer cartridge, a de-aerating port and one port connected with the compressor. In the first switching state the 3/2-way valve connects the respective air dryer cartridge with the compressor, whereas in the second switching state the 3/2-way valve connects a port of the air dryer cartridge with the de-aerating port.

For another embodiment of the invention, the at least one valve (or another valve) is able to link both of the two air dryer cartridges at the same time with the compressor. In case that a large volumetric flow of dried pressurized air is to be supplied to the pressurized air system or circuits (e.g. in case of an additional turbo loader and/or of the option to operate the compressor with an increased number of revolutions), this might be done by simultaneous load phases of the two air dryer cartridges. With these simultaneous load phases an overload is avoided that might occur when using one single air dryer cartridge.

For an alternative or cumulative embodiment the aforementioned valves(s) or another valve might be able to connect the two air dryer cartridges simultaneously with the de-aerating port. At operating states where there is no need for the supply of pressurized air to the pressurized air system or circuits, dried air in the pressurized air source might be used for simultaneously regenerating both air dryer cartridges.

It is possible that the aforementioned valves are directly electrically controlled by an electronic control unit, wherein the valves might be solenoid valves. For another embodiment of the invention at least one valve is pilot-controlled by a solenoid valve. It is possible that the solenoid valve is only responsible for controlling the pilot pressure for this valve and providing the explained functionalities. However, it is also possible that at least one solenoid valve is used multifunctional. The solenoid valve might both provide the pilot pressure for the aforementioned valve and control further valves and functions. According to one example in the figures, a 3/2-way solenoid valve is shown for providing a control pressure used for switching the aforementioned 5/2-way valve. For an alternative embodiment shown in FIG. 2, two 3/2-way solenoid valves are used each being responsible for providing the pilot pressure for pneumatically controlled 3/2-way valves being located upstream from the air dryer cartridges.

For one inventive embodiment the pressurized air system is supplied with pressurized air via a central conduit bifurcating to a plurality of consumer circuits, in particular service brake circuits, auxiliary consumer circuits, a trailer brake circuit and an air suspension circuit of the utility vehicle. The pressure in the central conduit (and in the further branches of the pressurized air system) is secured by at least one check valve. It is also possible that two check valves are used. These two check valves are located downstream from the two air dryer cartridges. The check valves open during the load phases of the associated air dryer cartridge. However, for one embodiment of the invention, dried pressurized air might be retransferred via a bypass of the at least one check valve opened by a regeneration valve. In general it is possible that the regeneration valve is used for the purpose to specifically supply dried pressurized air to the air dryer cartridge that is regenerated.

For another embodiment of the invention a quite simple regeneration valve is used. For this embodiment the regeneration valve is linked with the output conduits of the air dryer cartridges by check valves that open for an air stream in the regeneration direction but block an air stream in the opposite direction. A pair of check valves integrated as described before avoids that an air stream in the output conduit of the air dryer cartridge which is used in the load phase is exhausted, whereas the other check valve opens for retransferring dried regeneration air to the air dryer cartridge which is regenerated.

It is possible that the regeneration valve is directly electrically controlled by the electronic control unit. For another embodiment of the invention the regeneration valve is pilot-controlled by a solenoid valve.

It is also possible that the solenoid valve for controlling the pilot pressure for the regeneration valve is only responsible for this function. For another embodiment of the invention the solenoid valve is multifunctional: in this case the solenoid valve is additionally used for controlling a pilot pressure for at least one controlled circuit protection valve. This controlled circuit protection valve is in particular responsible for the control of the filling of the circuits with pressurized air, the protection of minimum limit pressures and/or for providing the order for filling the different consumer circuits of the pressurized air system.

The regeneration air stream builds a kind of lost air stream which is not supplied to the pressurized air system. The regeneration air stream might be influenced by changing the opening duration of the regeneration valve. For an alternative or cumulative embodiment, the regeneration air stream might be influenced by use of a throttle integrated into the regeneration valve or into a conduit connected with the regeneration valve (i.e. an upstream or downstream conduit of the regeneration valve). It is also possible that the regeneration valve comprises a plurality of switching states with different throttle cross-sections or throttle characteristics between an open switching state and a closed switching state. It is also possible that the regeneration valve does not comprise any closed switching state but only a state with a minimized throttle cross-section.

Furthermore it is possible that a pressure regulation is done by a pressure control valve and/or by controlling the output of the compressor which in the end influences the volumetric flow of pressurized air supplied for the air dryer cartridges. Another embodiment of the invention suggests providing a solenoid valve that controls a pilot pressure. The pilot pressure might be used for changing the switching state of the pressure control valve. It is also possible that the pilot pressure is used for controlling the compressor, e.g. for controlling the number of revolutions of the compressor or for controlling the transmission ratio of a continuously variable transmission used for driving the compressor as described in DE 10 2008 006 860 A1. Furthermore, it is possible that the pilot pressure controlled by the solenoid valve is used both for controlling the pressure control valve as well as for controlling the compressor.

A specific operation of the inventive air processing device is possible in case of providing a valve transferring the pressure controller into a de-aerating state when connecting both air dryer cartridges with the de-aerating port. Due to the fact that for the connection of both air dryer cartridges with the de-aerating port the pressurized air supplied by the compressor is automatically transferred to the de-aerating port, a very simple "loader-unloader"-control concept is provided. As one option it is also possible that additionally in the unloader operating state specified above simultaneously a regeneration takes place wherein dried pressurized air flows via an associated regeneration valve through one of the air dryer cartridges (or both air dryer cartridges) for regeneration which is then also exhausted via the de-aerating port.

For another embodiment of the inventive air processing device an electronic control unit is provided. The electronic control unit is equipped with control logic. The control logic initiates and terminates a regeneration state of an air dryer cartridge independent on a load phase of the other air dryer cartridge. For an alternative or cumulative embodiment it is possible that by use of the control logic and the electronic control unit with a control of solenoid valves the compressor is connectable with one or both air dryer cartridge(s).

It is also possible that in the control unit on the basis of an appropriate control logic the required regeneration air volume, a volumetric flow for regeneration or the duration of the regeneration for the specific air dryer cartridge to be regenerated is determined or approximated. For the two air dryer cartridges during the regeneration the same or individually adapted differing regeneration air volumes, volumetric flows or durations might be used. After determining the required regeneration air volume, volumetric flow or duration the regeneration state of the related air dryer cartridge is terminated after the determined required regeneration air volume or volumetric flow has streamed through the air dryer cartridge or the determined required duration of regeneration has lapsed. Suitable methods for determining or approximating the regeneration air volume, the volumetric flow and/or the duration of the regeneration are e.g. disclosed in documents EP 0 808 756 B2, EP 1 390 244 B1, EP 0 093 253 B2 and WO-A-91/16224.

For another embodiment of the invention the control logic provides the option of controlling the solenoid valves by the electronic control unit for connecting both air dryer cartridges for a simultaneous load phase with the compressor and/or for simultaneously regenerating both air dryer cartridges, so for connecting the dried pressurized air source via the air dryer cartridges with the de-aerating port. The simultaneous regeneration of both air dryer cartridges is in particular controlled in operating states of the utility vehicle with at least decreased needs of pressurized air in the pressurized air system.

The novel air processing devices have improved options for a control or use of the air streams in a load phase and/or during regeneration.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
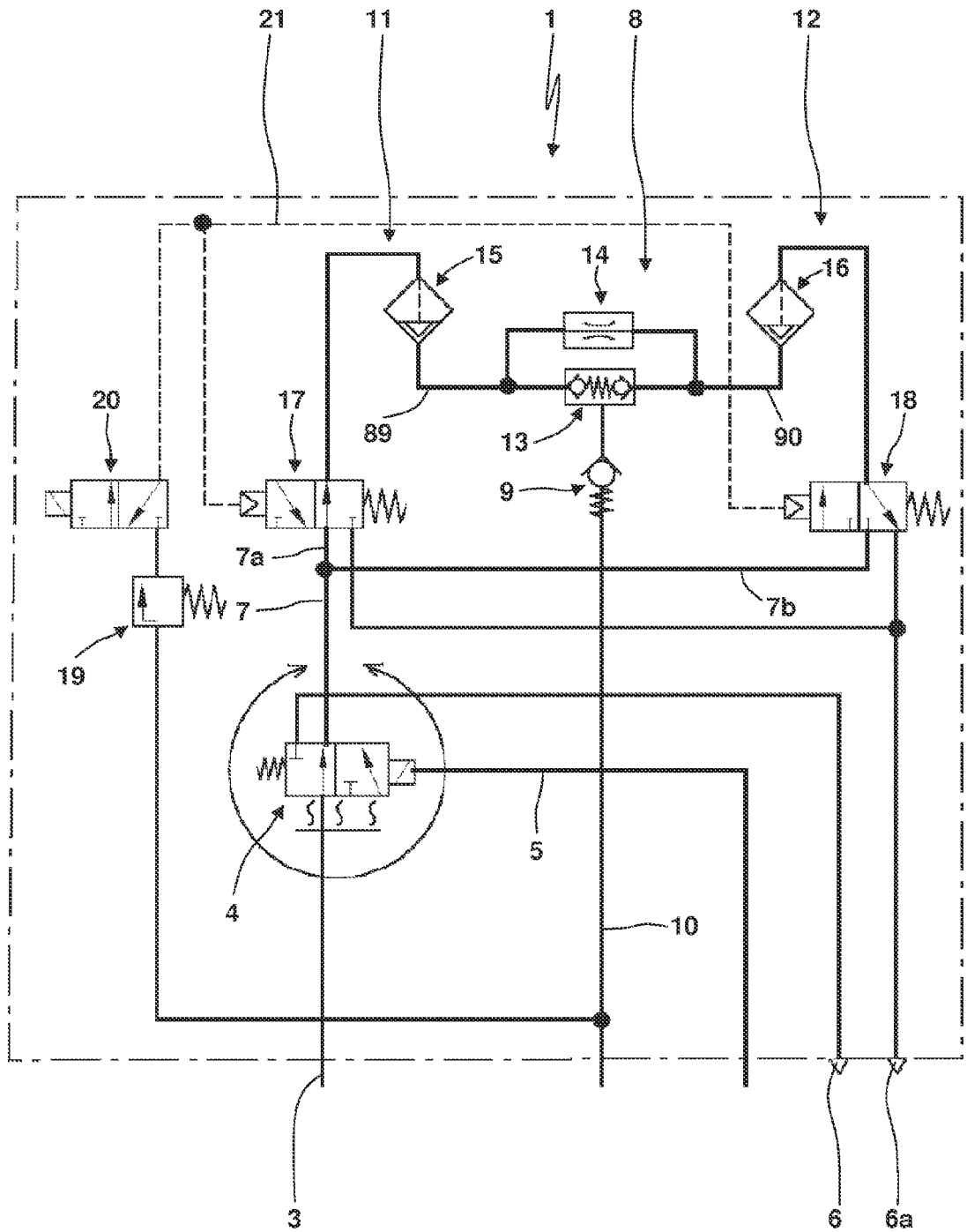
FIG. 1 schematically shows an air processing device according to the prior art, here with an air dryer including two chambers according to the data sheet of a product with the product-No. 432431 of WABCO.

Referring now in greater detail to the drawings, FIG. 1 schematically shows an air processing device 1 for a utility vehicle known from the prior art. The air processing device 1 is supplied with pressurized air from a compressor 2 via an input conduit 3. For the control of a pressure level in the air processing device 1 the input conduit 3 is pneumatically connected with a pressure control valve 4. For the shown embodiment the pressure control valve 4 is a pneumatically switched 3/2-way valve. In dependence on the pressure in an associated pneumatic control conduit 5 the pressure control valve connects the input conduit 3 with a de-aerating port 6 so that in this switching state pressurized air from the compressor 2 is exhausted to the environment whereas in the other switching state the input conduit 3 is connected with an input conduit 7. Via an air dryer unit 8 with a check valve 9 located downstream from the air dryer unit 8 the input conduit 7 is connected with a central conduit 10 for supplying a pressurized air system. In the pressurized air system the central conduit 10 supplies pressurized air for a plurality of consumer circuits via circuit protection valves. In the air dryer unit the input conduit 7 bifurcates into two branches with the two input conduits 7a, 7b building two parallel paths 11, 12. The two paths 11, 12 are reunified by a double-check valve 13 located upstream from the check valve 9. Parallel to the double-check valve 13 the two paths 11, 12 are connected by a throttle 14. In each of the paths an air dryer cartridge 15, 16 is located. In each of the two paths 11, 12 a pneumatically controlled 3/2-way valve 17, 18 is used which is located upstream from the air dryer cartridges 15, 16. The 3/2-way valves 17, 18 are controlled by the same control or pilot pressure but have alternating switching states as follows:

In the switching state shown in FIG. 1 for a pilot pressure below a threshold value the 3/2-way valve 17 connects the input conduit 7a with the air dryer cartridge 15, whereas the 3/2-way valve 18 connects the air dryer cartridge 16 with a de-aerating port 6a. For pilot pressure above a threshold value acting upon the control ports of the 3/2-way valves 17, 18, the 3/2-way valves 17, 18 are switched to the other switching state. Now 3/2-way valve 17 connects the input port of air dryer cartridge 15 with the de-aerating port 6a, whereas the 3/2-way valve 18 connects the input port of the air dryer cartridge 16 with the input conduit 7. The pilot pressure for the 3/2-way valves 17, 18 is taken from the central line 10 and is influenced by a pressure relief valve 19 as well a by an electrically controlled 3/2-way valve 20. The 3/2-way valve 20 in one switching state is open for a pilot pressure supplied by the central conduit 10, whereas in the other switching state the control conduit 21 is connected with an exhaust port of the 3/2-way valve 20.

The function of the air processing device 1 known from prior art as shown in FIG. 1 is as follows: In the switching state of the 3/2-way valve 17, 18 according to FIG. 1 the path 11 is used in a load phase. Pressurized air is supplied by the compressor 2 via the input conduit 3, the pressure protection valve 4, the input conduit 7, the path of the input conduit 7a, the 3/2-way valve 17, the air dryer cartridge 15, the double-check valve 13 and the check valve 9 to the central conduit 10. However, from the pressurized air supplied by the compressor 2 a partial volumetric air stream bifurcates via the throttle 14 for being used in path 12 for a regeneration of the air dryer cartridge 16. Pressurized air of this partial stream that has been previously dried in the air dryer cartridge 15 streams in reverse direction through air dryer cartridge 16 and passes via the 3/2-way valve 18 to the exhaust port 6a. By switching the 3/2-way valve 17 to the other state, the use of the two paths 11, 12 is reversed so that path 12 is used for a load phase whereas path 11 is used in a regeneration phase. With this change also the double-check valve 13 changes its switching state so that the streaming direction of the partial air stream through throttle 14 reverses.

One problem for the embodiment according to FIG. 1 known from prior art is that it is not possible to control the partial air stream streaming through throttle 14 for the regeneration process. The partial air stream depends on the design of the cross-section of throttle 14. In case of using the compressor 2 with the idle number of revolutions the relation of the partial air stream used for the regeneration to the partial air stream supplied to the central conduit 10 is comparatively high, whereas with an increase of the number of revolutions of the compressor 2 the relation of the aforementioned partial air streams becomes smaller.

For the embodiments of the invention shown in FIGS. 2 to 9 the same reference numerals have been used for corresponding pneumatic components as used for the embodiment known from the prior art according to FIG. 1. Here, the same reference numerals have in particular been used for components with a corresponding design and/or at least partially comparable functionalities.

Figure 2:
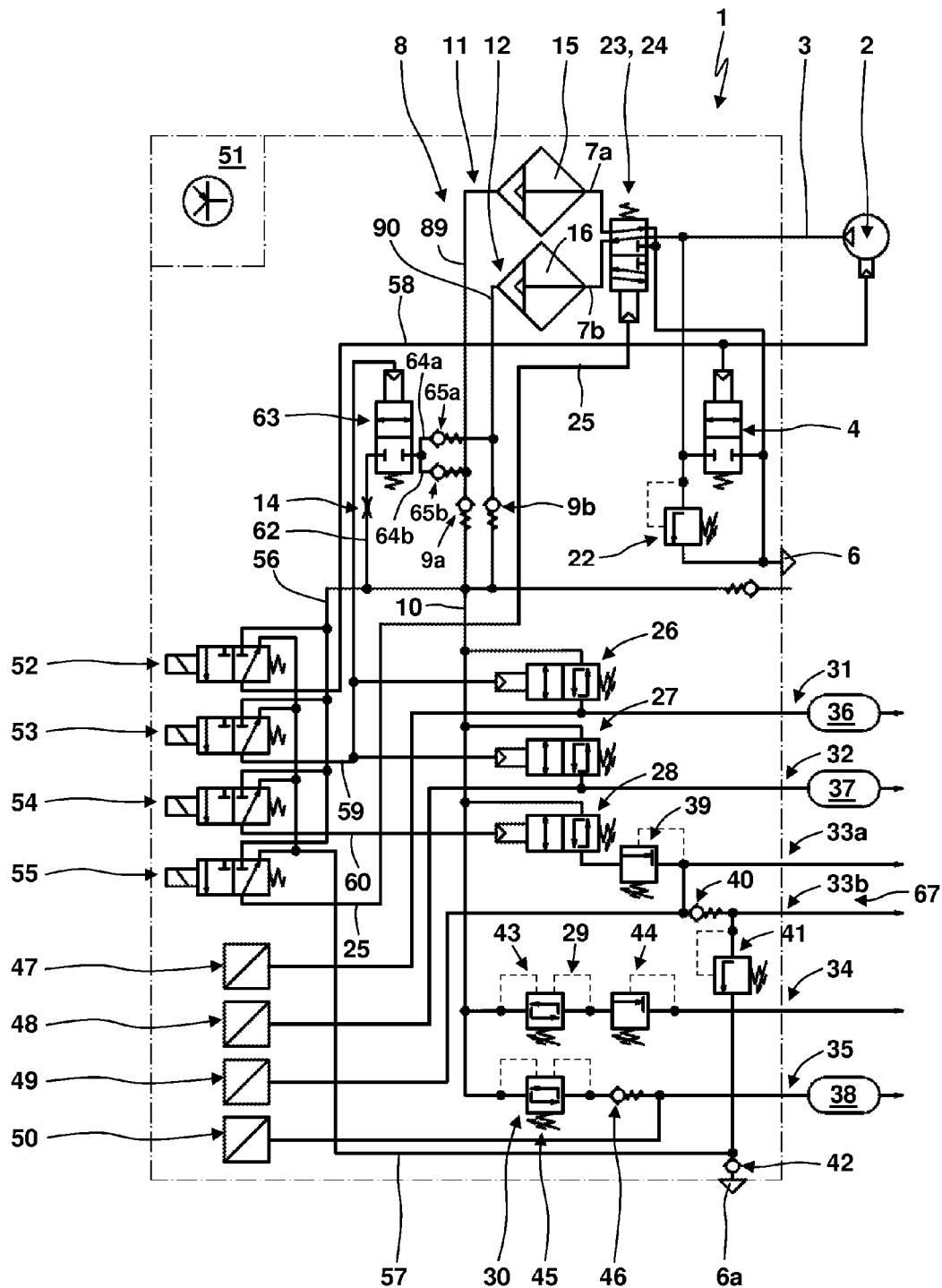
FIG. 2 to FIG. 9 schematically show different embodiments of inventive air processing devices.

According to the embodiment of the invention shown in FIG. 2, the input conduit 3 is connected with the exhaust port 6 via a protection valve 22. The input conduit 3 bifurcates via a valve 23, here a 5/2-way valve 24, into the two paths 11, 12 with the associated air dryer cartridges 15, 16. Two ports of the 5/2-way valve 24 are connected with the inputs of the air dryer cartridges 15, 16, whereas two ports are connected with the exhaust port 6 and another port is connected with the input conduit 3. It is possible that the valve 23 is directly electronically controlled. However, for the shown embodiment, valve 23 is pneumatically controlled via a control conduit 25. At the output of the air dryer cartridges 15, 16 the pressure is secured by check valves 9a, 9b located upstream from the point of reunification of the two paths 11, 12 to the central conduit 10. In the switching state of the 5/2-way valve 24 shown in FIG. 2 with the control conduit 25 having no pressure above a threshold value the 5/2-way valve 24 connects the input conduit 3 with the air dryer cartridge 16 whereas the air dryer cartridge 15 is connected with the de-aeration port 6. Accordingly, in this switching state path 12 is used for the load phase. It is possible that during this load phase the path 11 is used for a regeneration phase. However, this use of path 11 is dependent on other conditions, here the switching states of other valves as explained in the flowing. However, in case of the control conduit 25 being subjected to pressure above a threshold value, the 5/2-way valve 24 is switched into a switching state wherein the air dryer cartridge 15 is connected with the input conduit 3, whereas the air dryer cartridge 16 is connected with the de-aeration port 6.

From the central conduit 10 consumer circuits 31, 32, 33, 34, 35 are supplied with pressurized air via the circuit protection valves 26, 27, 28, 29, 30. The consumer circuit 31 is a service brake circuit I with an integrated reservoir 36. The consumer circuit 32 is a service brake circuit II with integrated reservoir 37. Consumer circuit 33 is a trailer brake circuit. Here, a partial consumer circuit 33a is related with the trailer brake, whereas another partial consumer circuit 33b is responsible for the spring-loaded brake or parking brake. The consumer circuit 34 serves for supplying pressurized air for auxiliary consumers. The consumer circuit 35 is an air suspension system comprising a reservoir 38. The circuit protection valves 26-30 are in particular used for determining or controlling the order of the filling of the consumer circuits, for securing minimum pressures in the consumer circuits, for providing the transverse supply of pressurized air from one consumer circuit to another consumer circuit in the normal operating mode or in case of a failure, in particular with the transverse supply from one reservoir of a service brake circuit.

For the shown embodiment the circuit protection valves 26-28 are pneumatically pilot-controlled pressure relief valves. By means of the pneumatic pilot pressure the opening pressure of the pressure relief valve might be reduced or the closed state of the pressure relief valve might be changed to an open state. The pressure protection valves 26, 27 are directly connected with the reservoirs 36, 37. A pressure limiting valve 39 is located downstream from the circuit protection valve 28. The output port of the pressure limiting valve 39 bifurcates to the parts of the consumer circuits 33a, 33b. In the partial consumer circuit 33b a check valve 40 is provided opening towards the consumer in the partial consumer circuit 33b. Downstream from this check valve 40 the partial consumer circuit 33b is connected with a de-aerating port 6a with an additional check valve 42 by a protection valve 41. The circuit protection valve 29 comprises a pressure relief valve 43 and a pressure limiting valve 44. The circuit protection valve 30 comprises a pressure relief valve 45 with a check valve 46 located downstream from the pressure relief valve 45. Pressure sensors 47-50 sense the pressures in the consumer circuits 31, 32, 33a and 35.

The air processing device 1 comprises a control unit 51 with control logic for fulfilling the control functions explained in the following. Pressure signals from the pressure sensors 47-50 are transferred to the control unit 51 for evaluation or further processing.

In the embodiment shown in FIG. 2 the control unit 51 controls four solenoid valves 52-55. Here, the solenoid valves 52-55 are 3/2-way valves. Via a supply conduit 56 bifurcating from the central conduit 10 respective ports of the solenoid valves 52-55 are supplied with pressurized air. Another port of the solenoid valves 52-55 is connected with a de-aerating conduit 57. The solenoid valves 52-55 comprise an additional port connected with control conduits 58-60, 25. The control conduit 58 is connected with a control port of the compressor 2. Furthermore, the control conduit 58 is connected with a control port of the pressure controller or pressure governor 4 that connects the input conduit 3 with the de-aerating port 6 for pressurized control port. The control conduit 59 is connected with the control ports of the circuit protection valves 26, 27 such that for pressurized control ports the opening pressures of the pressure relief valves are reduced or the pressure relief function is removed. The control conduit 60 is connected with a control port of the circuit protection valve 28. The control conduit 25 is connected with the control port of valve 23.

From the central conduit 10 or the supply conduit 56 a regeneration conduit 62 with an integrated throttle 14 bifurcates. The regeneration conduit 62 is connected with a regeneration valve 63. The regeneration valve 63 might be directly electrically controlled by the control unit 51. However, for the embodiment shown in FIG. 2 the regeneration valve 63 is pneumatically pilot-controlled. The pilot port of the regeneration valve 63 is connected with the control conduit 59. For the shown embodiment the regeneration valve 63 is a 2/2-way valve. The 2/2-way valve is in a closed switching state without pneumatical actuation of the control conduit 59, whereas the 2/2-way valve switches to an open state when pressurizing the control conduit 59. At the output of the regeneration valve 63 there is a bifurcation to two partial regeneration conduits 64a, 64b with check valves 65a, 65b that are each connected with one of the paths 11, 12. The connections are located upstream from the check valve 9a, 9b, but at the output of the air dryer cartridges 15, 16.

The operation of the air processing device according to FIG. 2 might be as follows: Pressurized air is supplied to the pressurized air system 67 with consumer circuits 31-35 both for refilling during the use of the pressurized air system 67 as well as for the first use with the filling of the pressurized air system 67. In the switching state of valve 23 not effective in FIG. 2 the path 11 is used in a load phase without any load phase in the path 12. Instead, the air dryer cartridge 16 is connected via valve 23 with the de-aeration port 6. The redirection of dried pressurized air from the central conduit 10 is blocked by check valve 9b. On the other hand, the regeneration valve 63 is in a closed state so that it is not possible that dried pressurized air streams back via the regeneration conduits 62, 64a. In this operating state the whole flow of pressurized air supplied by the compressor 2 is dried in the air dryer cartridge 15 and supplied via the central conduit 10 to the pressurized air system 67. However, in case of detecting that a regeneration of the air dryer cartridge 16 is necessary, it is possible to separately initiate and terminate a regeneration of the air dryer cartridge 16 independent on the load phase in the path 11. For this regeneration the regeneration valve 63 is switched into the open state by pressurizing the control conduit 59 by the solenoid valve 53. A partial air stream dimensioned by throttle 14 is supplied from central conduit 10 via the regeneration valve 63 in the open state in opening direction through check valve 65a to the air dryer cartridge 16. The partial air stream flows in reverse direction in the regeneration phase through the air dryer cartridge 16 and is exhausted via valve 23 and the de-aerating port 6. Despite of the open regeneration valve 63, the transit of pressurized air from the path 11 into the partial regeneration conduit 64b is blocked by check valve 65b. In case that a regeneration air volume calculated or known by the control unit 51 has streamed through the air dryer cartridge 16, it is possible to close the regeneration valve 63 by the control unit 51. This can be done independently on the load phase in path 11 which might be continued. The used regeneration air stream might be taken directly from path 11 and might be retransferred to the air processing device 1 without arriving at the pressurized air system 67. However, it is also possible that the regeneration air stream is taken from a reservoir, e.g. a reservoir 36 and/or 37, of the pressurized air system 67. It is also possible that via the control conduit 58 the supply of pressurized air by the compressor 2 is increased, decreased or stopped. Furthermore, it is possible that for opened pressure controller or governor 4 pressurized air from the compressor 2 is exhausted to the environment. In this case it might also be possible that from one of the reservoirs 36, 37 for opened regeneration valve 36 with opened check valves 65a, 65b a regeneration air stream passes through both air dryer cartridges 15, 16 and streams to the port 6 for a simultaneous regeneration of both air dryer cartridges 15, 16. It is also possible that during the load phase in path 11 a plurality of shorter regeneration phases are controlled in the other path 12 or a regeneration phase in this path 12 is temporarily interrupted.

After a specific duration of the load phase in the path 11 which might be given a priori or might be determined throughout the operation by the control unit 51 the operation is switched to a load phase in path 12. This change is controlled by switching the valve 23 by pneumatical de-aeration of the control line 25 by solenoid valve 55. Also during the load phase in path 12 a regeneration of the air dryer cartridge 15 in path 11 might be independently initiated and terminated as explained above by controlling the regeneration valve 63. For this operating state the check valve 65b is opened for the regeneration air stream.

Figure 3:
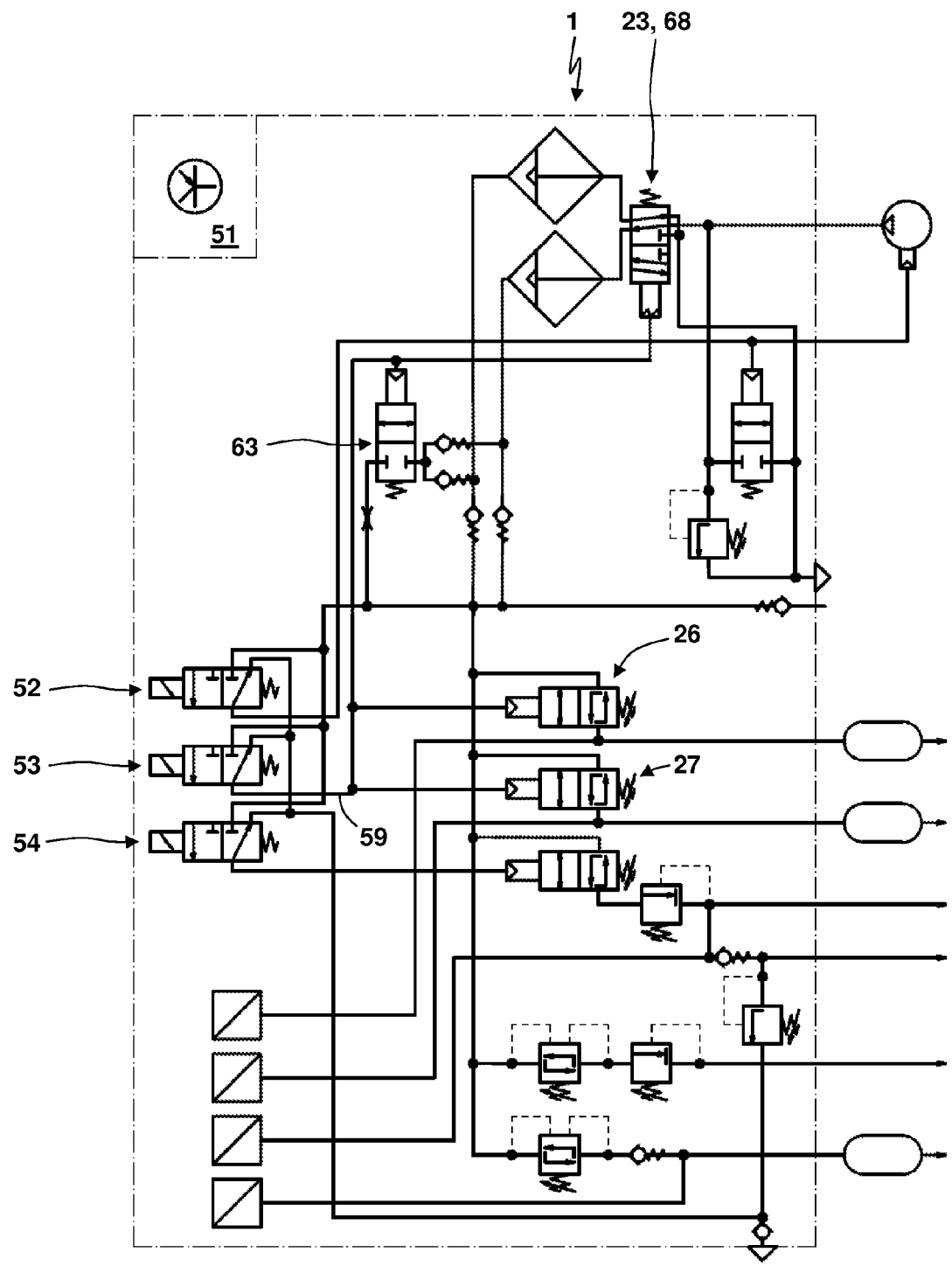

Whereas in the embodiment shown in FIG. 2 the solenoid valve only controls valve 23, for the embodiment shown in FIG. 3 the solenoid valve 55 has been removed. For this embodiment, the control conduit 59 is connected with the control ports of the circuit protection valves 26, 27 and the control port of the regeneration valve 63. Additionally, the control conduit 59 is also connected with a control port of valve 23. Valve 23 in this case might be a so-called bi-stable valve 68. Without a pneumatic actuation this bi-stable valve remains in its actual switching state. The actual switching state is only left in case of a pneumatic actuation. The bi-stable valve 68 might (differing from the shown embodiment) also be directly electronically controlled. Also a pneumatic bi-stable valve might be used comprising a control port as described in DE 10 2008 038 437 A1, wherein for a pressurized control port an actual switching state is held and the switching state is changed for a short pressure relief with subsequent continuous pressurization of the control conduit 59.

Figure 4:
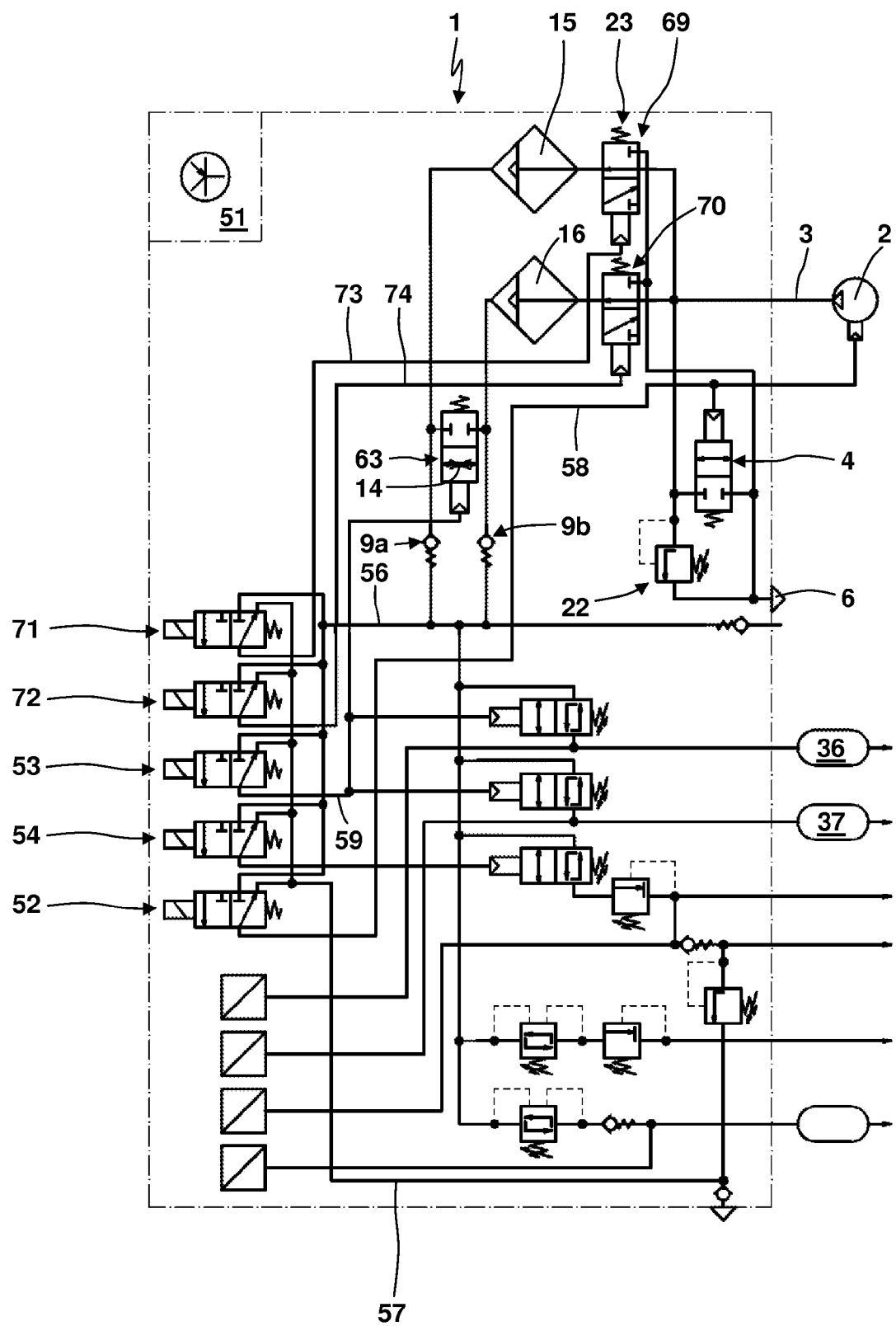

According to the embodiment shown in FIG. 4, the valve 23 is built with two pneumatically controlled 3/2-way valves 69, 70 located upstream from the air dryer cartridges 15, 16.

In the switching state shown in FIG. 4 the 3/2-way valves 69, 70 connect the input conduit 3 and the compressor 2 with the associated air dryer cartridges 15, 16. In the switching state not effective in FIG. 4 the 3/2-way valves 69, 70 connect the input ports of the air dryer cartridges 15, 16 with the exhaust 6. The 3/2-way valves 69, 70 are controlled by associated solenoid valves 71, 71 which are electrically controlled by the control unit 51. By means of the solenoid valves 71, 72 the control ports of the 3/2-way valves 69, 70 and the control conduits 73, 74 can be alternately connected with the supply conduit 56 and the de-aerating conduit 7. According to FIG. 2 valve 23 only provides an alternative connection of the paths 11, 12 with the compressor 2, whereas an independent control of the connections for the load phase and the regeneration phase was provided by the additional regeneration valve 63. Instead, the embodiment with the two 3/2-way valves 69, 70 building the valve 23 provides four independent possibilities for connecting the inputs of the air dryer cartridges 15, 16 in dependence on the electronical control of the solenoid valves 71, 72:
- connection of the input of the air dryer cartridge 15 with the compressor 2, whereas the input of the air dryer cartridge 16 is connected with the de-aerating port 6;
- connection of the input of the air dryer cartridge 16 with the compressor 2, whereas the input of the air dryer cartridge 15 is connected with the de-aerating port 6;
- connection of the two inputs of the two air dryer cartridges 15, 16 with the compressor 2;
- connection of the input of the two air dryer cartridges 15, 16 with the de-aerating port 6.

The operating states specified above generally provide the option of independently using one of the air dryer cartridges 15, 16 in a load phase, the regeneration of one of the air dryer cartridges 15, 16, simultaneous load phases of both air dryer cartridges 15, 16 and/or simultaneous regeneration phases of the two air dryer cartridges 15, 16.

In the embodiment shown in FIG. 4 the regeneration valve 63 has a different design and is integrated in a different way: Here, the throttle 14 is integrated into the regeneration valve 63 such that the throttle becomes effective in the open state. Furthermore, the regeneration valve 63 is not supplied with pressurized air from the regeneration conduit 62. Instead, the regeneration valve 63 directly connects the output conduits of the air dryer cartridges 15, 16 at a location in front of the check valves 9a, 9b. Instead of the two check valves 9a, 9b, also only one double-check valve 13 might be used.

During the filling phase for the embodiment shown in FIG. 3 at first the reservoirs 36, 37 of the service brake circuits are filled. For this purpose, the circuit protection valves 26, 27 can be switched by pressurization of the control conduit 59 into an open state or a bridging state. At the same time, the regeneration valve 63 is switches into the open state. However, this open state of the regeneration valve 63 is without any effect. This is due to the fact that in the path 11 (or 12) there is a higher pressure than in the regeneration conduit 62 so that the check valves 65a, 65b are blocked. In case that the reservoirs 36, 37 are filled with the simultaneous pressurization of the control ports of the circuit protection valves 26, 27 as well as of the regeneration valve 36, the required regeneration is initiated with the use of dried pressurized air from the reservoirs 36, 37. Differing from this embodiment, the embodiment shown in FIG. 4 does not provide the option of a regeneration with dried pressurized air from the reservoirs 36, 37.

Figure 5:
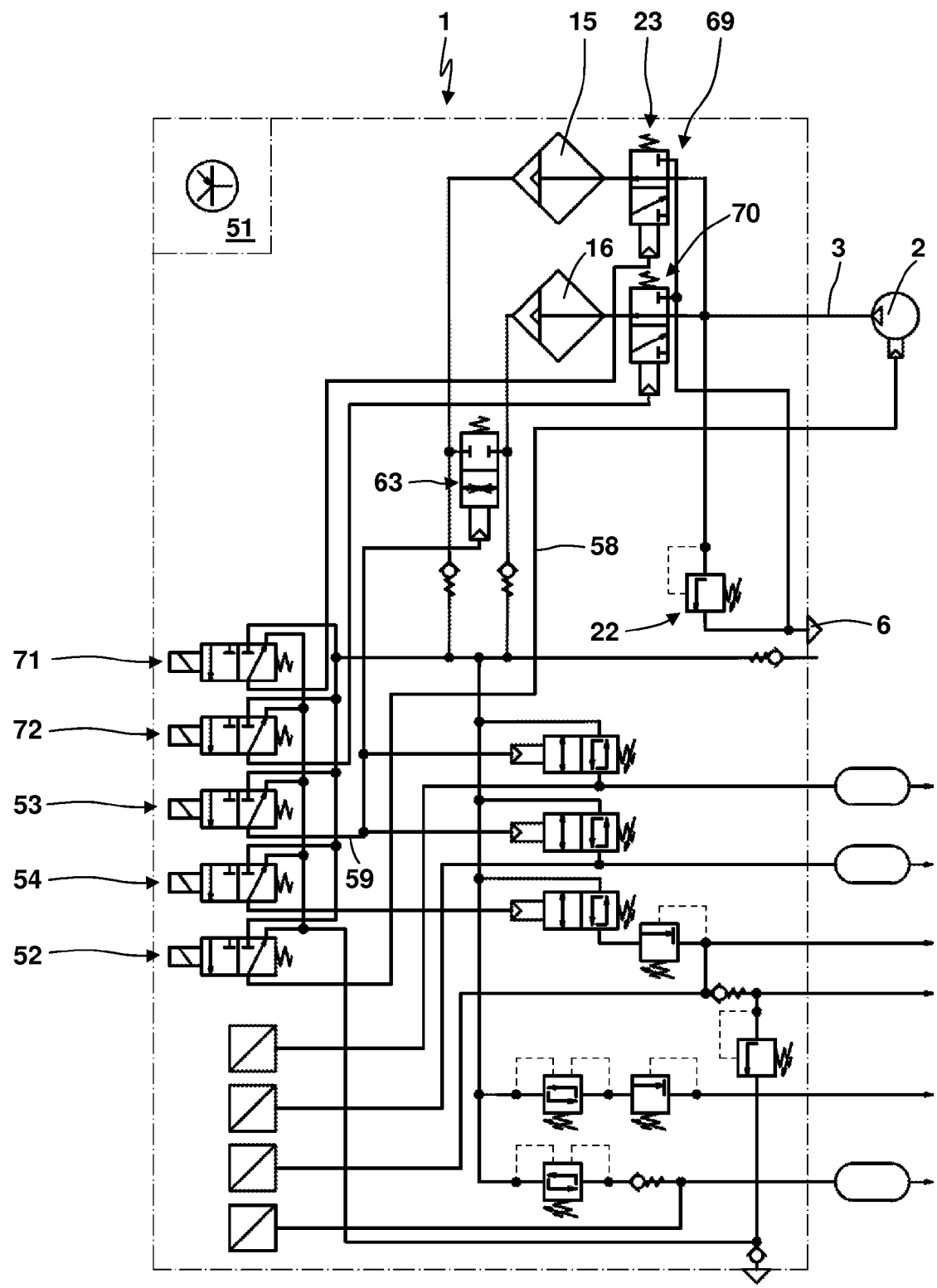

The embodiment shown in FIG. 5 in general corresponds to the embodiment of FIG. 4. However, in FIG. 5 the solenoid valve 52 only controls the control port of the compressor 2 via the control conduit 58. The reason is that the pressure controller or pressure governor 4 has been removed so that the input conduit 3 is directly connected with the de-aeration port 6 via the protection valve 22. In this case, a pressure control might be done by a control of the compressor 2.

Figure 6:
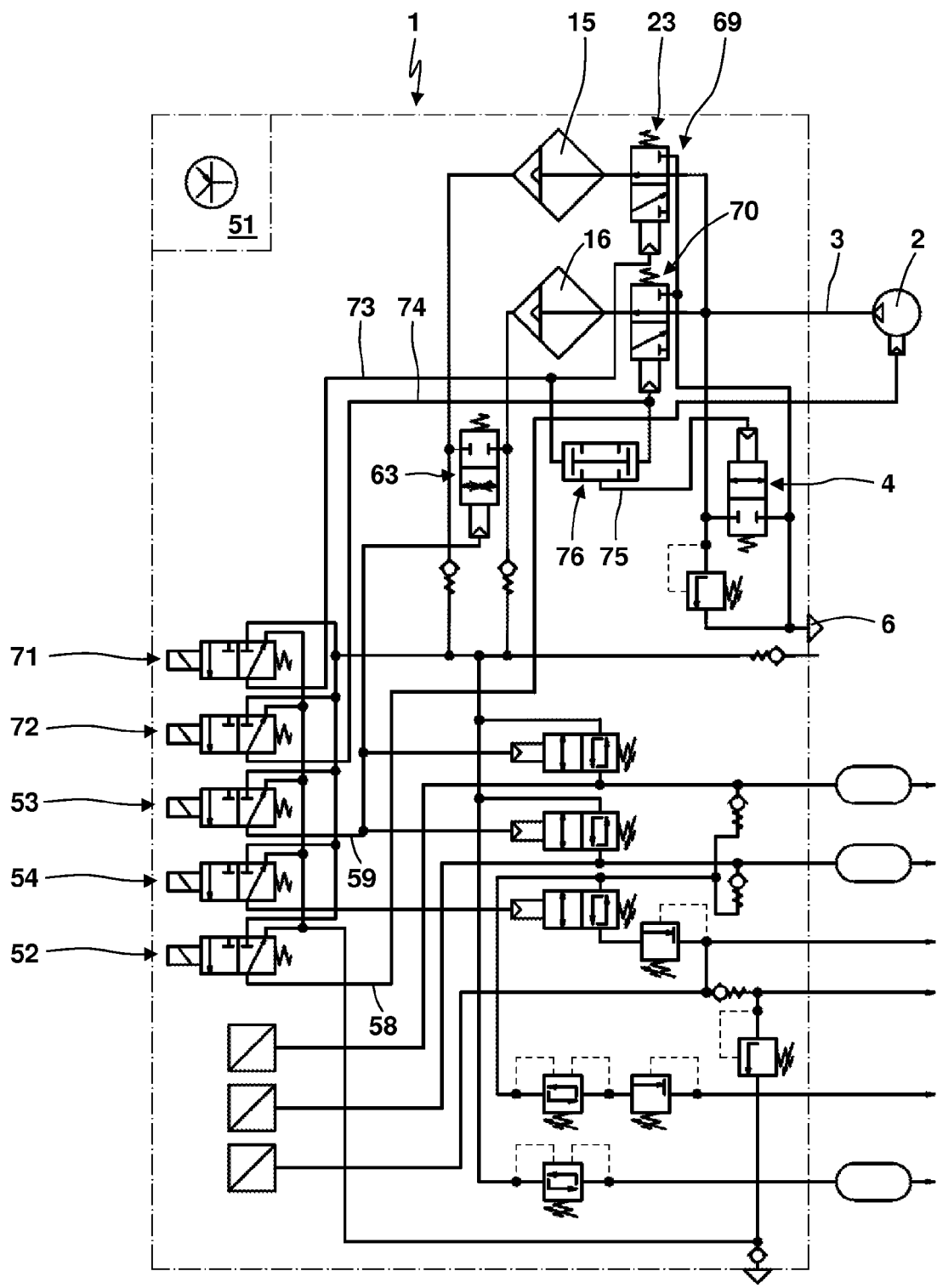

The embodiment shown in FIG. 6 generally corresponds to the embodiment shown in FIG. 4. However, here the solenoid valve 52 only controls the control port of the compressor 2 via the control conduit 58. The pressure controller or pressure governor 4 is in this case controlled by a control conduit 75, wherein the pressure in the control conduit 75 is controlled by a valve 76. The valve 76 is connected to the control conduits 73, 74. Valve 76 has the function of a so-called "&-element" so that the control conduit 75 is only pressurized in case that both the control conduit 73 and the control conduit 74 are pressurized. Instead, the control conduit 75 is not pressurized in case that at least one of the control conduit 73, 74 is not pressurized. Accordingly, the pressure controller 4 is automatically brought into the de-aerating state in case that both control conduits 73, 74 are pressurized, so in case that both 3/2-way valves 69, 70 are brought into the switching state wherein the inputs of the air dryer cartridges 15, 16 are connected with the de-aerating port 6. For the embodiment shown in FIG. 6, the pressure controller 4 is controlled by the cooperation of the solenoid valves 71, 72.

Figure 7:
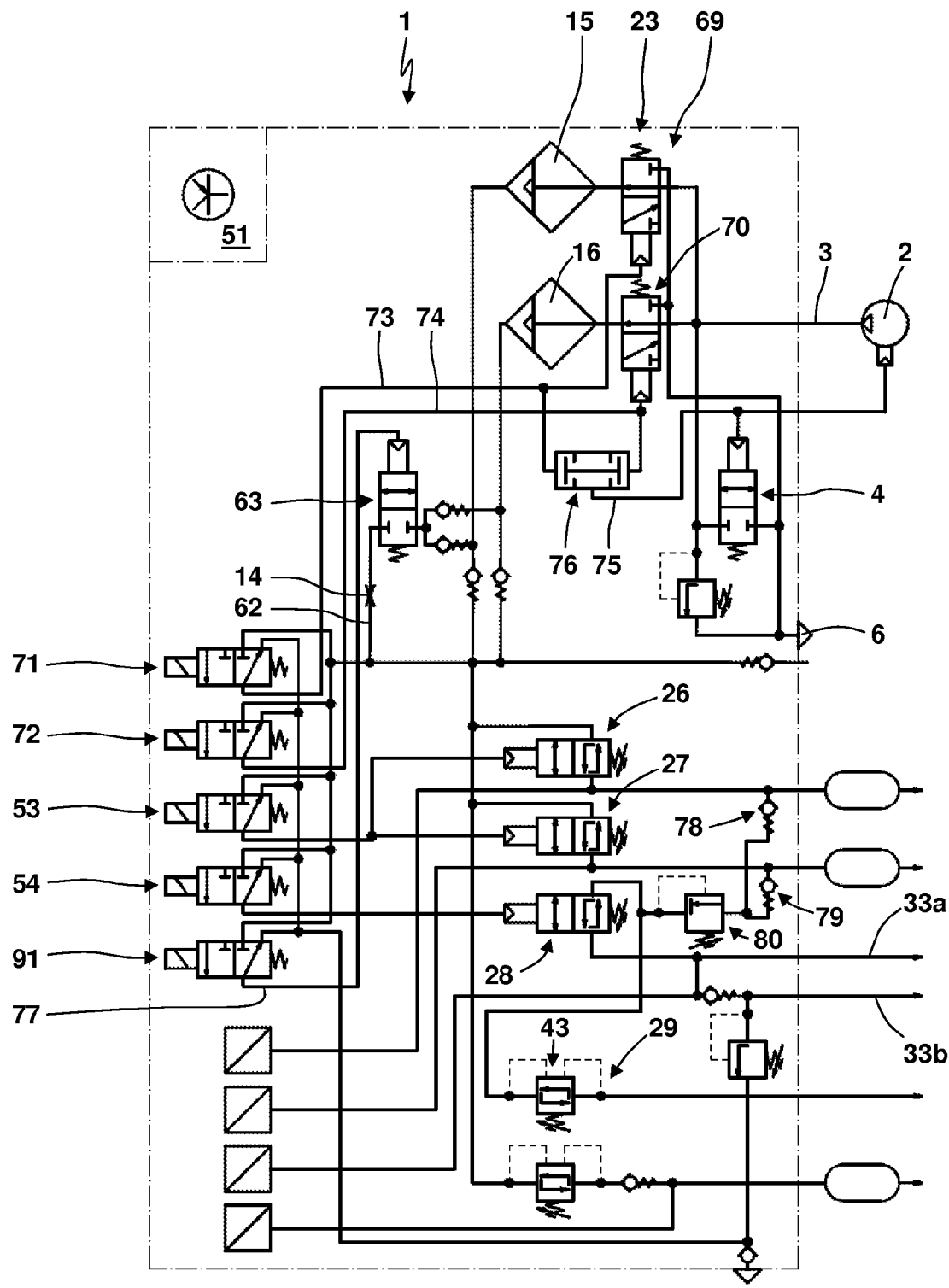

The embodiment shown in FIG. 7 in general corresponds to the embodiment shown in FIG. 6. However, here the solenoid valve 53 is only used for a control of the circuit protection valves 26, 27. Furthermore, in this embodiment the solenoid valve 52 with the control conduit 58 for controlling the compressor 2 has been removed. Instead, the control port of the compressor 2 is connected with the control conduit 57 of the valve 76. An additional solenoid valve 91, here a 3/2-way valve, is provided which is controlled by the control unit 51 for a pressurization or de-aeration of the control conduit 77. The control conduit 77 is linked with a control port of the regeneration valve 63 so that the regeneration valve 63 might be separately controlled. For this embodiment the regeneration valve 63 is located downstream from the regeneration conduit 62 with throttle 14 but upstream from the regeneration conduits 64a, 64b with check valves 65a, 65b according to the embodiment shown in FIG. 2. Furthermore, according to FIG. 7 the circuit protection valve 29 is solely built by a pressure relief valve 43. The pressure relief valve 43 is not directly connected with the central conduit 10 but cumulatively supplied with pressurized air via check valves 78, 79, a pressure limiting valve 80 and the circuit protection valve 28. The corresponding applies for the consumer circuits 33a, 33b.

Figure 8:
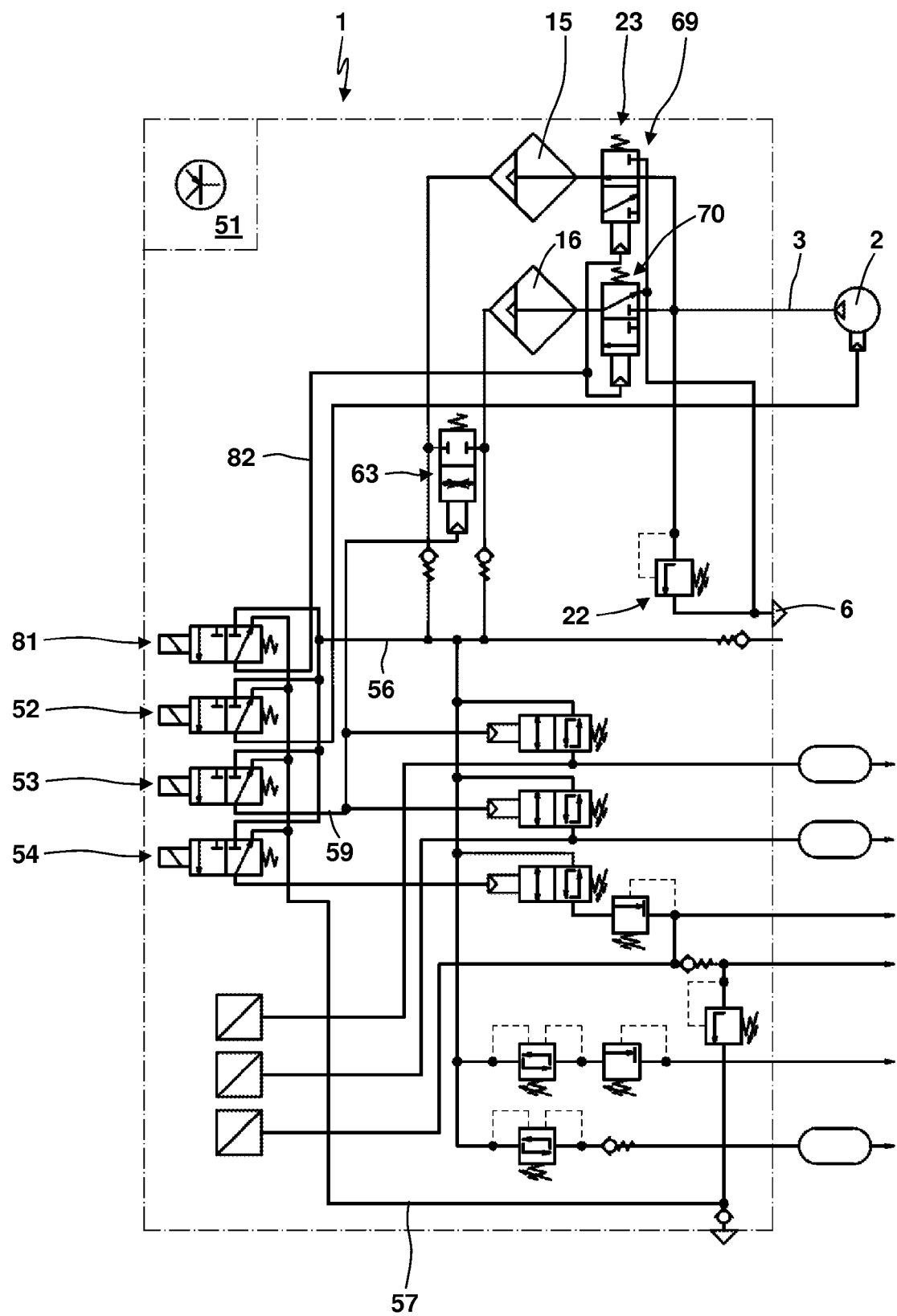

FIG. 8 shows a variation of the embodiment shown in FIG. 5 with one solenoid valve being removed and saved. Instead of the two solenoid valves 71, 72 a common solenoid valve 81 controlled by the control unit 51 embodied as a 3/2-way valve is used. The control conduit 82 is aerated and de-aerated by its connection with the supply conduit 56 or the de-aerating conduit 57. The control conduit 82 is connected with the control ports of the 3/2-way valves 69, 70 for a common control of these control ports. This requires that the 3/2-way valves 69, 70 according to FIG. 8 have switching states alternated to the switching states according to FIG. 5. Accordingly, in the switching state effective in FIG. 8 for not pressurized control conduit 82 the 3/2-way valve 69 connects the air dryer cartridge 15 with the compressor 2 whereas the 3/2-way valve 70 connects the air dryer cartridge 16 with the de-aeration port 6. This design only provides an alternating use of the 3/2-way valves which is quite similar to the effect of the 5/2-way valve 24 according to FIG. 2. Nevertheless, also for this embodiment by an actuation of the regeneration valve 63 it is possible to initiate a regeneration in one path 12, 11 independent on a load phase in the other path 11, 12, to maintain the regeneration phase and/or load phase and terminate this phase or these phases.

Figure 9:
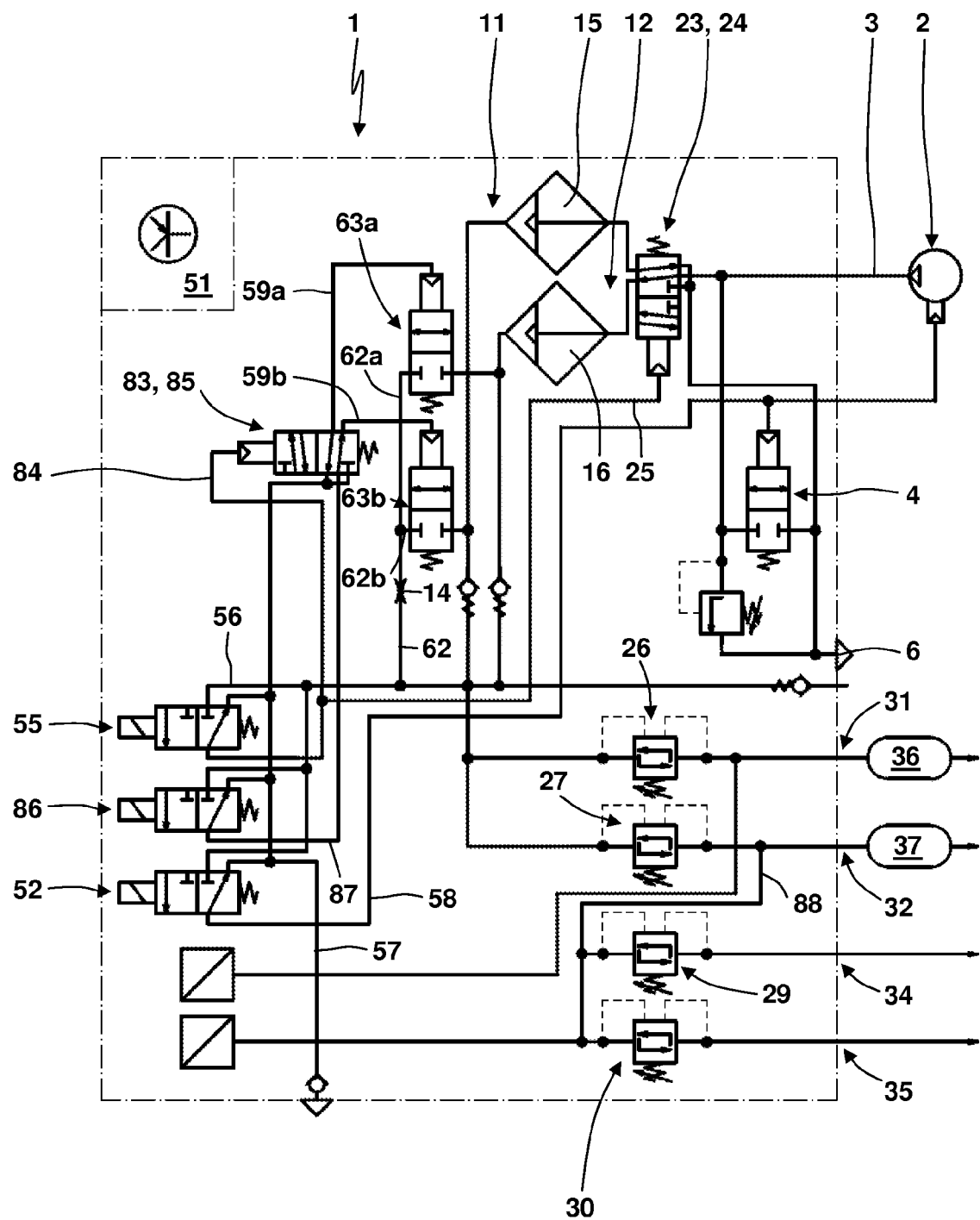

Whereas for the embodiment shown in FIG. 9 the 5/2-way valve 24, the pressure controller 4 and the protection valve 22 correspond to the embodiment of FIG. 2, here the control of the regeneration phase is done in a different way: The regeneration conduit 62 bifurcates behind the throttle 14 into partial regeneration conduits 62a, 62b supplying the regeneration valves 63a, 63b with a regeneration air stream. The regeneration valves 63a, 63b are 2/2-way valves comprising an open state and a closed state. It is possible that the regeneration valves 63a, 63b are directly electronically controlled by the control unit 51. However, FIG. 9 discloses an embodiment wherein the regeneration valves 63a, 63b are pneumatically controlled. The regeneration valves 63a, 63b are in their closed states without a pressurization of the control ports. The regeneration valves 63a, 63b are each connected with the output conduits of the air dryer cartridges 15, 15 on the side opposite to the partial regeneration conduit 62a, 62b. The control conduits 59a, 59b of the regeneration valves 63a, 63b are controlled by a valve 83 which in the embodiment shown in FIG. 9 is a 5/2-way valve 85 controlled by a control conduit 84. The control conduit 84 bifurcates from the control conduit 25 so that the control pressure for the 5/2-way valve 85 might be controlled by the solenoid valve 55.

The air processing device 1 according to FIG. 9 comprises another solenoid valve 86 embodied as a 3/2-way valve which is controlled by the control unit 51. The solenoid valve 86 is connectable with the de-aeration conduit 57 or the supply conduit 56 by a control conduit 87. In the switching state effective in FIG. 9, the 5/2-way valve 85 connects the control conduit 59a with the de-aeration conduit 57 with the consequence that the regeneration valve 63a is in the switching state shown in FIG. 9. Instead, with the electrical actuation of the solenoid valve 55 and a pressurization of the control conduit 84 the 5/2-way valve 85 is switched for connecting the control conduit 59b of the regeneration valve 63b with the de-aeration conduit 57. Accordingly the regeneration valve 63b is switched into the closed state. By means of the 5/2-way valve in each switching state it is possible to specifically transfer one of the regeneration valves 63a, 63b into its closed state. The switching state of the other regeneration valves 63a, 63b is not only dependent on the switching state of the 5/2-way valve 85. The control conduit 59a, 59b of the other regeneration valve 63a, 63b in one switching state of the 5/2-way valve 85 is connected with the control conduit 87 which (in dependence on the electrical control of the solenoid valve 87) is aerated or de-aerated. Accordingly, at the end by means of the electrical control of the solenoid valve 87 the regeneration phase might be initiated, interrupted or terminated.

Differing from the other embodiments according to FIG. 9 in the consumer circuits 31, 32, 34, 35 there are no controllable circuit protection valves used. Here, the consumer circuits 31, 32 are supplied with pressurized air by circuit protection valves 26, 27 being pressure-relief valves. A conduit 88 bifurcates between the circuit protection valve 27 and the reservoir 37. The conduit 88 serves for supplying the consumer circuits 34, 35. Here, the circuit protection valves 29, 30 are embodied as non-controllable pressure relief valves.

Mixed designs of the different embodiments shown in FIG. 2-9 are also possible and suggested to the person with ordinary skill in the art. The embodiments show basic pneumatical and/or electro-pneumatic solutions for the desired functionalities that might be combined with each other according to the needs.

The inventive air processing device 1 might be used for a compressor 2 which is permanently driven (100% actuation duration). With the inventive air processing device 1 an increased need of pressurized air might be satisfied which might lead to a reduction of the volumes of the reservoirs of the pressurized air system. This is in particular of advantage for so-called swap body vehicles for transferring containers. The transfer of the containers is related with repeated loading and unloading. The transfer requires large volumes of pressurized air which is due to the de-aeration and aeration of the air suspension system for a control of the level of the vehicle during loading and unloading.

The inventive air processing device might also be used for city bus systems with a high frequency of brake actions via the service brake circuits and possible subsequent actuations of the spring loaded brake. Furthermore, the control of the air suspension system for lifting and lowering the platform of the city bus systems for easing the access to the city bussed for passengers is related with increased required volumes of pressurized air.

By means of the choice of the duration of the regeneration als an adaptation of the pressure in the system might be provided. It is also possible that for the control of the compressor, of the load phase and/or of a regeneration phase a detected or anticipated downhill drive is considered where a supply of pressurized air with increased pressure might be done without undesired energy losses. Furthermore, it is possible that the duration of the regeneration is changed when detecting that a consumer circuit or a partial system fails.

With respect to the paths 11, 12 and the air dryer cartridges 15, 16 in the above specification, terms as "input" or "output" or "upstream" or "downstream" relate to the load phase. In the regeneration phase a port or side here denoted "input" in fact builds an "output" for the pressurized air streaming in reverse direction.

To name one example, the pressurized air supplied by the compressor according to FIG. 2 streams in the following order through the input conduit 7a, 7b, the air dryer cartridges 15, 16 and the output conduits 89, 90 during the load phase. Instead, during the regeneration phase the dried pressurized air streams from the output conduits 89, 90 through the air dryer cartridge 15, 16 to the input conduits 7a, 7b.

I claim:

1. An air processing device comprising:
a compressor;
two air dryer cartridges, the air dryer cartridges having a load phase and being located in two parallel paths;
an electronic control unit, the electronic control unit including control logic for controlling regeneration of one of the air dryer cartridges independent from the load phase of the respective other of the air dryer cartridges; and
wherein output conduits of the air dryer cartridges are connected with each other by a regeneration valve controlled by the electronic control unit.

2. The air processing device of claim 1, further comprising at least one valve being located between the air dryer cartridges and the compressor, the at least one valve selectively connecting one of the air dryer cartridges with one element selected from the group consisting of the compressor and a de-aerating port.

3. The air processing device of claim 2, wherein the valve has a switching state in which the two air dryer cartridges are simultaneously connected with the compressor.

4. The air processing device of claim 2, wherein the valve has a switching state in which the two air dryer cartridges are simultaneously connected with the de-aerating port.

5. The air processing device of claim 3, wherein the valve has a switching state in which the two air dryer cartridges are simultaneously connected with the de-aerating port.

6. The air processing device of claim 2, wherein the valve selectively connects one element selected from the group consisting of one of the air dryer cartridges, the respective other of the air dryer cartridges and the two air dryer cartridges with the compressor or with the de-aerating port.

7. The air processing device of claim 6, further comprising a solenoid valve, the valve being designed as a pilot valve being controlled by the solenoid valve.

8. The air processing device of claim 1, wherein a solenoid valve is designed and arranged to provide a control pressure for one element selected from the group consisting of a pressure controller and an unloader valve.

9. The air processing device of claim 1, further comprising a valve, the valve being designed and arranged to control a pilot pressure of a pressure controller for transferring the pressure controller into a de-aerating switching state, the valve being designed and arranged to be controlled to produce the pilot pressure when both of the air dryer cartridges are connected with a de-aerating port.

10. The air processing device of claim 1, wherein the control logic is designed and arranged to initiate or terminate a regeneration phase of one of the air dryer cartridges independent from a load phase of the respective other one of the air dryer cartridges.

11. The air processing device of claim 10, wherein the electronic control unit is designed and arranged to determine a required regeneration air volume for each of the air dryer cartridges and to terminate a regeneration phase of the air dryer cartridges after the determined regeneration air volume has streamed through the respective one of the air dryer cartridges.

12. The air processing device of claim 10, wherein the control logic is designed and arranged to connect the two air dryer cartridges with the compressor for a simultaneous load phase of the two air dryer cartridges for a turbo-load operation with an increased stream of pressurized air.

13. The air processing device of claim 10, wherein the control logic is designed and arranged to connect the two air dryer cartridges with a de-aerating port for simultaneous regeneration.

14. The air processing device of claim 10, wherein the control logic is designed and arranged to connect the compressor with at least one of the air dryer cartridges.

15. An air processing device comprising:
a compressor;
two air dryer cartridges, the air dryer cartridges having a load phase and being located in two parallel paths;
an electronic control unit, the electronic control unit including control logic for controlling regeneration of one of the air dryer cartridges independent from the load phase of the respective other of the air dryer cartridges; and
wherein a central line supplied with pressurized air via at least one check valve is connected via a regeneration valve to output conduits of the air dryer cartridges.

16. The air processing device of claim 15, wherein the at least one check valve is interposed between a respective output conduit of the air dryer cartridges and the regeneration valve, the at least one check valve being designed and arranged to open for an air stream towards the air dryer cartridges.

17. The air processing device of claim 15, wherein the regeneration valve is designed and arranged to be pilot-controlled by a pneumatic solenoid valve.

18. The air processing device of claim 17, wherein the solenoid valve pneumatically controlling the regeneration valve is designed and arranged to also control at least one pilot-controlled circuit protection valve.

19. The air processing device of claim 15, further comprising a throttle being integrated into one element selected from the group consisting of the regeneration valve and a conduit being connected with the regeneration valve.

* * * * *